June 27, 1950 S. M. BRODY 2,512,712
COMBINATION CONTAINER AND HEATER
Filed Aug. 22, 1945 2 Sheets—Sheet 1

INVENTOR.
SOL MYER BRODY.
BY Joshua R...
HIS ATTORNEY

June 27, 1950        S. M. BRODY        2,512,712
COMBINATION CONTAINER AND HEATER Filed Aug. 22, 1945        2 Sheets—Sheet 2

INVENTOR.
SOL MYER BRODY
BY Joshua R.H. Potts

HIS ATTORNEY.

Patented June 27, 1950

2,512,712

UNITED STATES PATENT OFFICE 2,512,712

COMBINATION CONTAINER AND HEATER

Sol Myer Brody, Philadelphia, Pa.

Application August 22, 1945, Serial No. 612,006

4 Claims. (Cl. 126—261)

This invention relates to a combination container and heater and is concerned primarily with a food container, such as lunch boxes, dinner pails and the like and a heater of the familiar electric stove type for heating or cooking food for a meal where kitchen facilities are not available.

Heretofore, a considerable amount of thought has been given to the needs of those who must eat their lunches at their locations, distant from cooking and heating facilities, and the long familiar Thermos bottle made it possible for a workman to have a cup of warm coffee with his lunch. This idea was extended to the Thermos jug which was provided with a larger opening than the Thermos bottle used for coffee, but the bulkiness of the jug or jar and the desirability of having some food warm while other food remains cold, has prevented widespread use of the Thermos jug for carrying lunches.

A broad object of this invention is the provision of a combination container and heater which will provide adequate carrying space for articles and a heater arranged compactly therein for carriage and means for bringing and securing the heater in position for use. More specifically this invention provides such a combination in which a small electrical heating unit is mounted upon a hinged platform member which carries a hinged supporting and protecting member to hold the electrical heating unit in proper operative position for use and, in connection with the hinged platform, will protect the heating unit when it is folded into position for carriage.

A better and more complete understanding of my invention may be had by referring to the accompanying drawings in which—

Figure 1:
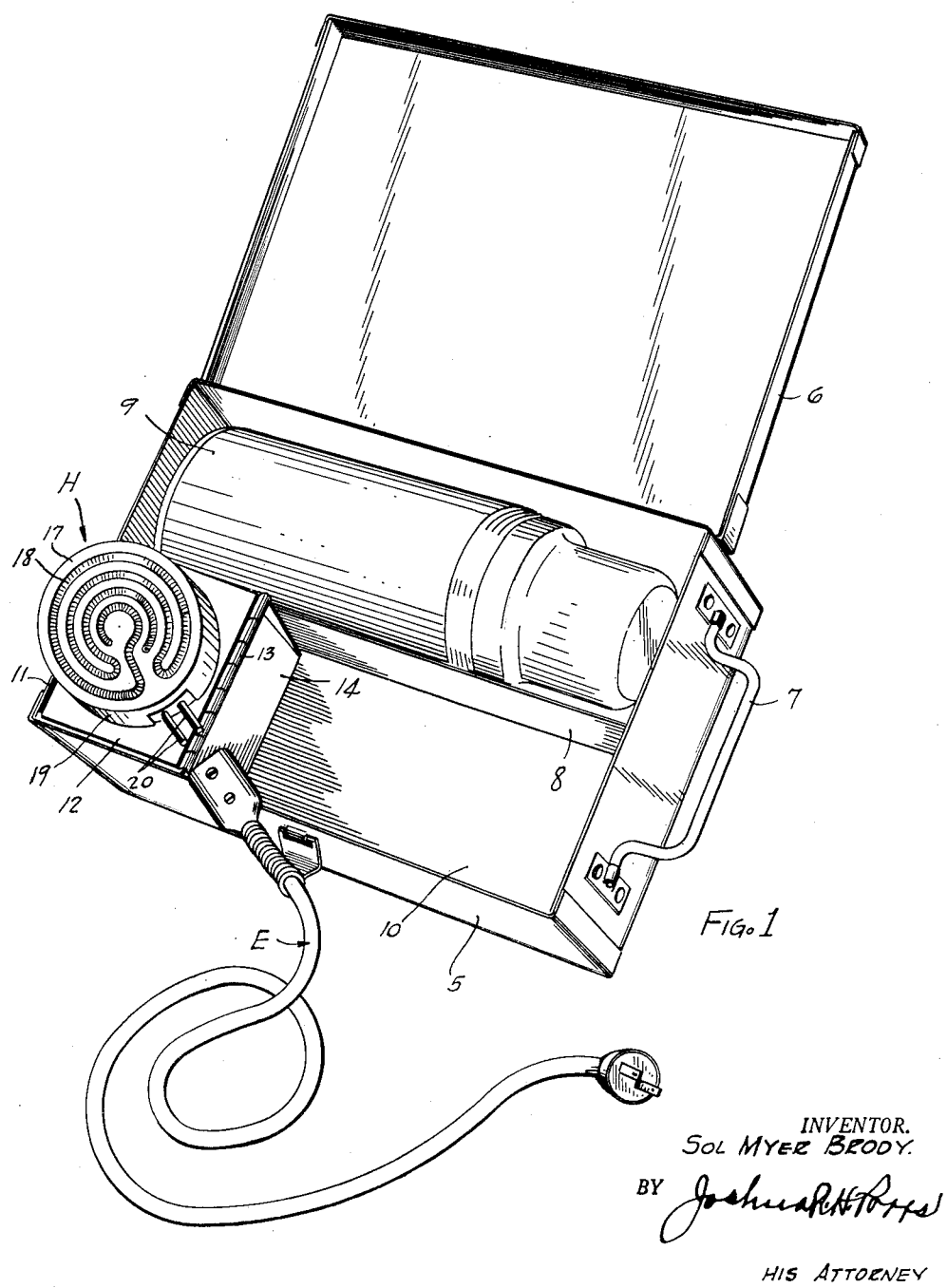
Figure 1 is a perspective view of my device opened up and with the heating unit in position for use.

Referring now to Figure 1, my invention comprises a box-like container 5 provided with a hinged cover 6 and pivoted carrying handle 7 and heating unit generally indicated by the letter H. A conventional partition 8 and Thermos bottle 9 may be employed if desired, and yet leave an elongated recess 10 for the reception of sandwiches and small container food which it may be desired to heat before eating.

Figure 2:
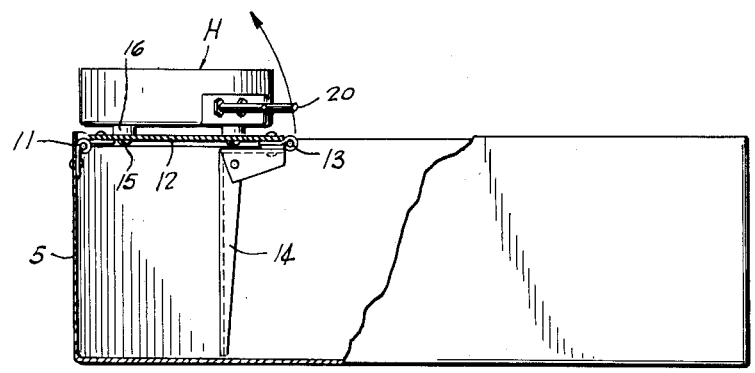
Figure 2 is a view partly in section and partly in elevation illustrating the heating unit in position for heating operations and the means for maintaining this position.

Referring now to Figure 2, a hinge 11 is secured to one end wall of the container 5 which defines the food receiving recess 10, and the free part of hinge 11 is secured to a small platform support 12 at one end thereof. The platform 12 carries a hinge 13 at its end opposite that which is attached to hinge 11 and the free portion of hinge 13 in turn carries an L-shaped supporting and protecting plate 14 which, in the position shown in Figure 2, has its shorter end resting beneath platform 12 while the platform is in the horizontal plane and in this position the longer side is in a vertical plane to provide a support for the free end of platform 12.

The platform 12 is provided with appropriate openings for the reception of screws 15 which are received within the threaded bosses 16 carried by the heating unit H for attachment purposes. The heating unit H is provided with the conventional ceramic body 17 and resistance coil 18, protecting shell 19 and electrical terminals 20.

The familiar extension cord generally defined by the letter E is provided with appropriate connections for establishing electrical connection between the heating unit H and a power source.

Figure 3:
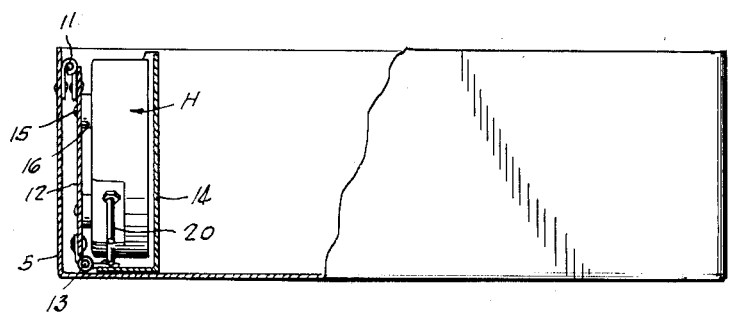
Figure 3 is a view siminar to Figure 2 with the heating unit folded into position suitable for the closing of the container cover preparatory to carriage.

As shown in Figure 3, after support 14 is swung on the axis of hinge 13 upwardly in the direction of the arrow of Figure 2, the supporting L-shaped plate 14 provides a wall to protect the resistance coil 18 and the ceramic body 17, and it is to be noted that the long leg of the L-shaped plate 14 lies in a plane parallel to the supporting platform 12 and a vertical wall of the container so as to provide a very compact assembly. Likewise, the shorter leg of L-shaped plate 14 lies parallel to a horizontal wall of the container and rests thereon to provide a support for the heating unit H and its supporting platform when the heating unit is not in use.

Obviously when it is desired to bring the heating unit into operative position and use, it is merely necessary to grasp the free end of plate 14, raise it until platform 12 is in a plane slightly inclined from the horizontal, and then swing the longer leg of plate 14 downwardly into the vertical position shown in Figure 2. The terminals 20 may then be connected with the extension cord and power source and the food to be warmed may be placed above the resistance coil.

While I have shown and described my preferred construction. I do not wish to be limited to the precise details shown and described, but wish to avail myself of all variations coming properly within the spirit and scope of the appended claims.

What is claimed is:

1. In a lunch box or the like the combination which comprises, a casing having compartments therein, a cover hinged to said casing forming a closure therefor, and a platform hinged to the casing and having a supporting leg hingedly mounted thereon and arranged in one of said compartments, said platform being adapted for holding a heating element with the element positioned for use when the platform is in a horizontal position, and characterized in that the leg of the platform provides a protecting cover for the heating unit when the platform is swung downwardly to a depending vertical position in the said compartment.

2. In a lunch box or the like the combination which comprises a casing having compartments therein, a cover hinged to said casing forming a closure therefor, and a platform hinged to the casing and having a supporting leg hingedly mounted thereon and arranged in one of said compartments, said platform being adapted for holding a heating element with the element positioned for use when the platform is in a horizontal position, and characterized in that the leg of the platform provides a protecting cover for the heating unit when the platform is moved to a vertical position in the said compartment, said device being further characterized in that the supporting leg of the platform has an off set portion, said portion providing a shelf extending under the platform for support thereof.

3. In a lunch box of the character described and having a partition and a plurality of walls, a pair of compartments defined by said partition and walls of the box, a platform hinged to one of the said walls, an L-shaped supporting member hinged to the platform, and an electrically actuated heating unit secured to the platform, said platform being normally retained in operative horizontal position by the said member, but swingable to a position wherein the member and the platform together with the partition and adjacent walls serve as a protecting recess for the heating unit when idle.

4. In a lunch box of the character described and including a partition and a plurality of walls, a pair of longitudinally extending compartments in said box and defined by the said partition and walls, a platform hinged to one of the walls and swingable into positions parallel and normal thereto, said platform having secured thereto a heating unit, a plate hinged to the platform, and swingable into a position effective for supporting the platform, said plate also being swingable to a second position in parallelism with the platform and effective as a protecting wall for the heating unit.

SOL MYER BRODY.

REFERENCES CITED

The following references are of record in the file of this patent:

UNITED STATES PATENTS

| Number | Name | Date |
| --- | --- | --- |
| 197,963 | Clifford | Dec. 11, 1877 |
| 507,828 | Montanus | Oct. 31, 1893 |
| 917,056 | Hallock | Apr. 6, 1909 |
| 1,187,664 | Sichel | June 20, 1916 |
| 1,209,610 | Muehleisen | Dec. 19, 1916 |
| 1,858,294 | Devine | May 17, 1932 |
| 1,959,198 | Conry | May 15, 1934 |
| 2,003,714 | Johnson | June 4, 1935 |
| 2,274,285 | Walker | Feb. 24, 1942 |
| 2,321,703 | Rivard | June 19, 1943 |